(12) United States Patent
Hirayama et al.

(10) Patent No.: US 8,044,133 B2
(45) Date of Patent: Oct. 25, 2011

(54) RUBBER COMPOSITION AND TIRE USING SAME

(75) Inventors: Tomoaki Hirayama, Kobe (JP); Takao Wada, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 202 days.

(21) Appl. No.: 11/812,001

(22) Filed: Jun. 14, 2007

(65) Prior Publication Data

US 2007/0299192 A1 Dec. 27, 2007

(30) Foreign Application Priority Data

Jun. 26, 2006 (JP) .................................. 2006-175098

(51) Int. Cl.
*C08K 3/04* (2006.01)
(52) U.S. Cl. ...................... 524/496; 524/495; 524/575.5
(58) Field of Classification Search .................. 524/495, 524/496, 575.5
See application file for complete search history.

(56) References Cited

U.S. PATENT DOCUMENTS

| | | | |
|---|---|---|---|
| 3,353,974 A | 11/1967 | Trimble et al. | |
| 5,807,918 A | 9/1998 | Carter | |
| 6,019,829 A | 2/2000 | Omae et al. | |
| 2001/0051684 A1* | 12/2001 | Luginsland et al. | 524/492 |
| 2003/0220437 A1* | 11/2003 | Hopkins et al. | 524/492 |
| 2005/0004311 A1* | 1/2005 | Wang | 525/178 |
| 2007/0055008 A1* | 3/2007 | Nanni et al. | 524/572 |

FOREIGN PATENT DOCUMENTS

| | | |
|---|---|---|
| DE | 44 15 720 A1 | 11/1995 |
| JP | 2002-533234 T | 10/2002 |
| JP | 2003-63206 A | 3/2003 |
| WO | WO-00/37555 A1 | 6/2000 |

OTHER PUBLICATIONS

Probst et al.; "Quality and Performance of Carbon Blacks from Plasma Process"; Rubber Chemistry and Technology, vol. 75, No. 5, Nov. 1, 2002, pp. 891-905, XP008105458.
"Pigment compendium"; Elsevier, Internet, http://books.google.de/books?; Sep. 7, 2004, pp. 216, col. 1, XP-002523765.
Office Action from corresponding Japanese Application No. 2007-160119 issued Feb. 23, 2010.

* cited by examiner

*Primary Examiner* — Peter D Mulcahy
(74) *Attorney, Agent, or Firm* — Birch, Stewart, Kolasch & Birch, LLP

(57) ABSTRACT

The present invention provides a rubber composition for a tire which makes it possible to consider an effect on environment, prepare for decrease in supply quantity of petroleum in future and improve weather resistance and rubber strength in good balance, and a tire prepared by using the rubber composition. The rubber composition of the present invention comprises not less than 20 parts by weight of a silica, not more than 5 parts by weight of a carbon black and 2 to 20 parts by weight of a turpentine soot and/or lamp black having an average particle diameter of not more than 1,000 nm, based on 100 parts by weight of a rubber component comprising a natural rubber and/or an epoxidized natural rubber, and a tire prepared by using the rubber composition.

12 Claims, No Drawings

RUBBER COMPOSITION AND TIRE USING SAME

BACKGROUND OF THE INVENTION

The present invention relates to a rubber composition and a tire using the same. Generally, raw materials such as carbon black derived from petroleum resources are used for a rubber composition for a tire. When carbon black is used as a reinforcing agent for a rubber, weather resistance can be also improved together with its reinforcing effect.

However, environmental problems have been recently emphasized and regulations on carbon dioxide emission have been made more rigorous. Further, since the amount of petroleum deposits is finite and there is a limit in using raw materials derived from petroleum resources, there is required development of a rubber composition for a tire comprising raw materials derived from non-petroleum resources that replace a portion or all of raw materials derived from petroleum resources used at present. Consequently, for example, raw materials such as silica derived from non-petroleum resources have been used as a material replacing carbon black. However, when silica is used as a reinforcing agent, there cannot be kept shielding and absorption effects of ultraviolet rays that carbon black has. Therefore, cracks are easily generated in the rubber by ultraviolet rays.

JP2003-63206A discloses ecological tires prepared by using raw materials derived from resources other than petroleum such as a natural rubber, silica, and sericite, thereby making it possible to consider an effect on environment and prepare for decrease in supply quantity of petroleum in future. Further, the disclosed ecological tires have performances bearing comparison with those of tires prepared by using raw materials derived from petroleum resources as main components. In those tires, silica is used as a material replacing carbon black, however, no consideration was made as to the point that when carbon black is replaced with silica, weather resistance is deteriorated.

SUMMARY OF THE INVENTION

It is an object of the present invention to provide a rubber composition, which makes it possible to consider an effect on environment, prepare for decrease in supply quantity of petroleum in future and improve weather resistance and rubber strength in good balance, and a tire prepared by using the rubber composition.

The present invention relates to a rubber composition comprising not less than 20 parts by weight of a silica, not more than 5 parts by weight of a carbon black and 2 to 20 parts by weight of turpentine soot (shouenboku) and/or lamp black (yuenboku) having an average particle diameter of not more than 1,000 nm based on 100 parts by weight of a rubber component comprising a natural rubber and/or an epoxidized natural rubber.

The average particle diameters of the turpentine soot and/or lamp black are preferably not more than 300 nm.

Further, the present invention relates to a tire prepared by using the aforementioned rubber composition.

According to the present invention, there is provided a rubber composition comprising specified amounts of specific rubber component, silica, carbon black and specific turpentine soot and/or lamp black, thereby making it possible to consider an effect on environment, prepare for decrease in petroleum supply in future, and improve weather resistance and rubber strength in good balance, and a tire prepared by using the rubber composition.

DETAILED DESCRIPTION

The rubber composition of the present invention comprises a rubber component, silica, carbon black and turpentine soot and/or lamp black.

The rubber component comprises a natural rubber (NR) and/or an epoxidized natural rubber (ENR).

NR is not particularly limited and those such as KR7, TSR20 and RSS#3 that are general in the tire industry can be used.

A content of NR in the rubber component differs depending on what member of the tire the rubber composition of the present invention is applied to. Specifically, when the rubber composition of the present invention is used for a tread, the content of NR is preferably not more than 50% by weight, more preferably not more than 40% by weight from the viewpoint of excellent grip performance. When the rubber composition of the present invention is used for a sidewall, the content of NR is preferably not less than 20% by weight, more preferably not less than 30% by weight in order to secure a rubber strength. When the rubber composition of the present invention is used for a clinch, the content of NR is preferably not less than 50% by weight, more preferably not less than 70% by weight in order to secure a rubber strength.

As for ENR, commercially available ENR may be used and NR may be epoxidized and used. The method of epoxidizing NR is not particularly limited and the epoxidation can be carried out using methods such as a chlorohydrin method, a direct oxidation method, a hydrogen peroxide method, an alkylhydroperoxide method and a peracid method. Examples of the peracid method are a method of reacting organic peracids such as peracetic acid and performic acid with NR.

An epoxidization ratio of ENR is preferably not less than 5% by mole, more preferably not less than 20% by mole. When the epoxidization ratio of ENR is less than 5% by mole, characteristics of ENR that grip performance and air permeation resistance are superior to NR tend not to appear. Further, the epoxidization ratio of ENR is preferably not more than 60% by mole, more preferably not more than 50% by mole. When the epoxidization ratio of ENR exceeds 60% by mole, there is a tendency that reversion arises at vulcanization, unity of a kneaded product is poor, the kneaded product is difficult to handle, a rubber strength and processability of the rubber composition are deteriorated, and further, durability of a product is lowered. Specific examples of such ENR are ENR25 (epoxidization ratio: 25% by mole) available from Kumpulan Guthrie Berhad Co., ENR50 (epoxidization ratio: 50% by mole) available from Kumpulan Guthrie Berhad Co. and the like. These ENR may be used alone or may be used in combination of at least two kinds thereof.

In the present invention, when NR and ENR are used in combination, it is possible to form a sea-island structure using raw materials derived from resources other than petroleum, and an effect of improving crack growth resistance is obtained. Further, when the rubber composition of the present invention is used as a tread, an effect of improving grip performance and rolling resistance property is also obtained.

Examples of the rubber component other than NR and ENR are, for instance, synthetic rubbers such as a styrene-butadiene rubber (SBR), a butadiene rubber (BR), an isoprene rubber (IR), a butyl rubber (IIR), a halogenated butyl rubber (X-IIR), an ethylene-propylene-diene rubber (EPDM), a chloroprene rubber (CR) and a halogenated product of a copolymer of isomonoolefin and p-alkylstyrene. However, when these synthetic rubbers are used, it is impossible to consider an effect on environment and prepare for decrease in supply quantity of petroleum in future. Therefore it is preferable that a synthetic rubber is not contained.

Silica is not particularly limited and those prepared by a dry process or a wet process can be used.

BET specific surface area (BET) of silica is preferably not less than 170 m$^2$/g, more preferably not less than 180 m$^2$/g. When the BET of silica is less than 170 m$^2$/g, an adequate reinforcing effect resulting from the contained silica tends not to be obtained. Further, the BET of silica is preferably not more than 250 m$^2$/g, more preferably not more than 240 m$^2$/g. When the BET of silica exceeds 250 m$^2$/g, there is a tendency that dispersibility, low heat build-up property and reinforcing property of the silica are deteriorated and rolling resistance is increased.

The amount of silica is not less than 20 parts by weight, preferably not less than 25 parts by weight based on 100 parts by weight of the rubber component. When the amount of silica is less than 20 parts by weight, environment cannot be considered, decrease in supply quantity of petroleum in future cannot be prepared for and further, an adequate reinforcing effect resulting from the contained silica is not obtained. Further, the amount of silica is not more than 100 parts by weight, more preferably not more than 90 parts by weight. When the amount of silica exceeds 100 parts by weight, processability is deteriorated, and further, as a result of an extrusion failure or a molding failure, defects in finished products tends to be caused. Further, when the rubber composition of the present invention is used for a tread, the amount of silica is preferably 40 to 90 parts by weight, more preferably 50 to 80 parts by weight in order to secure grip performance and abrasion resistance. When the rubber composition of the present invention is used for a sidewall, the amount of silica is preferably 15 to 50 parts by weight, more preferably 20 to 40 parts by weight in order to secure crack growth resistance. When the rubber composition of the present invention is used for a clinch, the amount of silica is preferably 50 to 90 parts by weight, more preferably 55 to 85 parts by weight in order to secure abrasion resistance in the case of contact with a rim.

The rubber composition of the present invention contains preferably a silane coupling agent together with the silica.

The silane coupling agent that can be used in the present invention is not particularly limited, and specific examples thereof are sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl) trisulfide, bis(3-trimethoxysilylpropyl)trisulfide, bis(3-triethoxysilylpropyl)disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane and 2-chloroethyltriethoxysilane. These silane coupling agents may be used alone or may be used in combination of two or more thereof.

The amount of silane coupling agent is preferably not less than 4 parts by weight, more preferably not less than 6 parts by weight based on 100 parts by weight of the silica. When the amount of silane coupling agent is less than 4% by weight, there is a tendency that Mooney viscosity is increased, processability and dispersibility of the silica are deteriorated, and reinforcing effect is lowered. Further, the amount of silane coupling agent is preferably not more than 16 parts by weight, more preferably not more than 14 parts by weight. When the amount of silane coupling agent exceeds 16 parts by weight, an effect resulting from the contained silane coupling agent is not observed and cost tends to be increased.

Nitrogen adsorption specific surface area (N$_2$SA) of the carbon black is preferably not less than 25 m$^2$/g, more preferably not less than 30 m$^2$/g. When the N$_2$SA of carbon black is less than 25 m$^2$/g, adequate reinforcing property resulting from the contained carbon black is not obtained and there is a tendency that required durability cannot be obtained. Further, the N$_2$SA of carbon black is preferably not more than 280 m$^2$/g, more preferably not more than 250 m$^2$/g. When the N$_2$SA of carbon black exceeds 280 m$^2$/g, processability is deteriorated and as a result of a dispersion failure, etc., durability of products tends to be lowered.

The amount of carbon black is not more than 5 parts by weight, more preferably not more than 3 parts by weight. When the amount of carbon black exceeds 5 parts by weight, environment cannot be considered and decrease in supply quantity of petroleum in future cannot be prepared for either.

The turpentine soot is a low grade of carbon black produced from forest product, and is not particularly limited, and can be produced, for example, by subjecting finely-cracked pine timbers being rich in resin to imperfect combustion and then collecting obtained soot.

The carbon content of turpentine soot is preferably not less than 80% by weight, more preferably not less than 90% by weight. When the carbon content of turpentine soot is less than 80% by weight, strength tends to be lowered because of by-products such as non-carbonized pine resin.

The average particle diameter of the turpentine soot is not more than 1,000 nm, preferably not more than 300 nm. When the average particle diameter of the turpentine soot exceeds 1,000 nm, a reinforcing effect and an effect of improving weather resistance resulting from the contained turpentine soot cannot be expected.

The lamp black is a low grade of carbon black prepared from vegetable oil and is not particularly limited, and can be produced by subjecting plant oils such as rape seed oil, sesame oil and tung oil to imperfect combustion and then collecting obtained soot.

The carbon content of lamp black is preferably not less than 80% by weight, more preferably not less than 90% by weight. When the carbon content of lamp black is less than 80% by weight, a rubber strength tends to be lowered because of the non-carbonized oil content.

The average particle diameter of the lamp black is not more than 1,000 nm, preferably not more than 300 nm. When the average particle diameter of the lamp black exceeds 1,000 nm, a reinforcing effect and an effect of improving weather resistance resulting from the contained lamp black cannot be expected.

The amount of the turpentine soot and/or lamp black is not less than 2 parts by weight, preferably not less than 5 parts by weight based on 100 parts by weight of the rubber component. When the amount of the turpentine soot and/or lamp black is less than 2 parts by weight, an effect of improving weather resistance is not obtained. Further, the amount of the turpentine soot and/or lamp black is not more than 20 parts by weight, preferably not more than 15 parts by weight. When the amount of the turpentine soot and/or lamp black exceeds 20 parts by weight, weather resistance is adequately improved but cost is increased because the price of raw materials is increased.

In the present invention, environment can be considered and decrease in supply quantity of petroleum in future can be prepared for by containing specified amounts of the specific rubber component, silica, carbon black and specific turpentine soot and/or lamp black, and further, an excellent rubber strength and superior weather resistance are obtained.

In the rubber composition of the present invention, compounding agents, for example, oil, wax, various antioxidants, stearic acid, zinc oxide, a vulcanizing agent such as sulfur and various vulcanization accelerators that are usually used in the tire industry can be suitably compounded, in addition to the aforementioned rubber components, silica, silane coupling agents, carbon black and turpentine soot and/or lamp black.

The rubber composition of the present invention is preferably used for a rubber composition for a tire and preferably used for a tread, a sidewall, or a clinch because it is suitable for exterior members (members subject to degradation by environmental stimulation such as sun light).

The tire of the present invention can be produced by a usual method. Namely, the rubber composition of the present invention in which the aforementioned compounding agents are compounded according to necessity is extruded and processed into a shape of the above-mentioned tire member at an unvulcanized stage, laminated with other members and vulcanized to obtain a tire.

The tire can be made as an ecological tire by using the rubber composition of the present invention, which makes it possible to consider an effect on environment and prepare for decrease in supply quantity of petroleum in future.

EXAMPLES

The present invention is described in detail based on Examples, but the present invention is not limited only to these.

Here, various chemicals used in Examples and Comparative Examples are explained.

Natural rubber (NR): TSR 20.

Epoxidized natural rubber (ENR): ENR 25 (an epoxidization ratio: 25%) available from Kumpulan Guthrie Berhad Co.

Carbon black: SHOWBLACK N220 ($N_2SA$: 115 $m^2/g$) available from CABOT JAPAN Kabushiki Kaisha.

Silica: ZEOSIL-195GR (BET: 180 $m^2/g$) available from Rhodia Japan Ltd.

Silane coupling agent: Si69 (bis(3-triethoxysilylpropyl) tetrasulfide) available from Degussa GmbH.

Turpentine soot (1): turpentine soot powder (average particle diameter: 500 nm) available from CHINESE INK CRAFT CENTER "KISHUUSHOUEN".

Turpentine soot (2): turpentine soot powder (average particle diameter: 50 nm) available from CHINESE INK CRAFT CENTER "KISHUUSHOUEN".

Lamp black (1): lamp black powder (average particle diameter: 500 nm) available from KOBAIEN Kabushiki Kaisha.

Lamp black (2): lamp black powder (average particle diameter: 50 nm) available from KOBAIEN Kabushiki Kaisha.

Oil: rapeseed oil available from The Nisshin OiliO Group, Ltd.

Wax: SUNNOC WAX available from OUCHI SHINKO CHEMICAL INDUSTRIAL CO., LTD.

Antioxidant: NOCRAC 6C (N-(1,3-dimethylbutyl)-N'-phenyl-p-phenylenediamine) available from OUCHI SHINKO CHEMICAL INDUSTRIAL CO., LTD.

Stearic acid: stearic acid available from NOF Corporation.

Zinc oxide: Zinc Oxide No. 1 available from Mitsui Mining And Smelting Co, Ltd.

Sulfur: sulfur powder available from Tsurumi Chemical Industry Co., Ltd.

Vulcanization accelerator: NOCCELER NS (N-tert-butyl-2-benzothiazolylsulfenamide) available from Ouchi shinko Chemical Industrial CO., LTD.

Examples 1 to 21 and Comparative Examples 1 to 3

Chemicals other than sulfur and a vulcanization accelerator were kneaded according to the compounding prescriptions shown in Tables 1 to 4 under the condition of about 130° C. for 2 minutes using a Banbury mixer manufactured by Kobe Steel Ltd., to obtain kneaded articles. Then, sulfur and a vulcanization accelerator were added to the kneaded articles obtained, and kneaded under the condition of 90° C. for 1.5 minutes using an open roll, to obtain unvulcanized rubber compositions. Further, the unvulcanized rubber compositions were vulcanized under the condition of 170° C. for 12 minutes to prepare the vulcanized rubber compositions of Examples 1 to 21 and Comparative Examples 1 to 3. Rubber compositions prepared in Examples 1 to 7 and Comparative Example 1 were used for a tread, rubber compositions prepared in Examples 8 to 14 and Comparative Example 2 were used for a sidewall, and rubber compositions prepared in Examples 15 to 21 and Comparative Example 3 were used for a clinch. Further, in the evaluation of the following tensile test, the rubber compositions for a tread were evaluated on the basis of Comparative Example 1, the rubber compositions for a sidewall were evaluated on the basis of Comparative Example 2, and the rubber compositions for a clinch were evaluated on the basis of Comparative Example 3.

(Tensile Test)

Tensile test was carried out according to JIS K6251 "Rubber, vulcanized or thermoplastic—Determination of tensile stress-strain properties" using No. 3 dumbbell type test pieces comprising the aforementioned vulcanized rubber compositions. Strength at break (TB) and elongation at break (EB) were measured, and energy at break (TB×EB/2) was calculated. The rubber strength index of Comparative Example 1 was referred to as 100 for evaluation of Examples 1 to 7, the rubber strength index of Comparative Example 2 was referred to as 100 for evaluation of Examples 8 to 14, and the rubber strength index of Comparative Example 3 was referred to as 100 for evaluation of Examples 15 to 21, and energy at break of each Example was represented by an index according to the following equation. The larger the rubber strength index is, the more superior the rubber strength is.

(Rubber strength index)=(Energy at break of each Example)÷(Energy at break of Comparative Example 1, 2, or 3)×100

(Weather Resistance)

The vulcanized rubber compositions of Examples 1 to 21 and Comparative Examples 1 to 3 were extended by 120% and were exposed outdoor for 2 months and each crack condition was visually observed. Rubber compositions in which no crack was generated are represented as "○" and rubber compositions in which cracks were generated are represented as "X".

Results of the above-mentioned tests are shown in Tables 1 to 3.

TABLE 1

| | Ex. | | | | | | | Com. Ex. |
|---|---|---|---|---|---|---|---|---|
| | 1 | 2 | 3 | 4 | 5 | 6 | 7 | 1 |
| Amounts (part by weight) | | | | | | | | |
| NR | 30 | 30 | 30 | 30 | 30 | 30 | 30 | 30 |
| ENR | 70 | 70 | 70 | 70 | 70 | 70 | 70 | 70 |
| Carbon black | 2 | 2 | 2 | 2 | 2 | 2 | 2 | 2 |
| Silica | 75 | 75 | 75 | 75 | 75 | 75 | 75 | 75 |
| Silane coupling agent | 6 | 6 | 6 | 6 | 6 | 6 | 6 | 6 |
| Turpentine soot (1) | 10 | — | — | — | — | — | — | — |
| Turpentine soot (2) | — | 5 | — | — | 10 | — | 2.5 | — |
| Lamp black (1) | — | — | 10 | — | — | — | — | — |
| Lamp black (2) | — | — | — | 5 | — | 10 | 2.5 | — |
| Oil | 15 | 15 | 15 | 15 | 15 | 15 | 15 | 15 |
| Wax | 1.5 | 1.5 | 1.5 | 1.5 | 1.5 | 1.5 | 1.5 | 1.5 |
| Antioxidant | 2 | 2 | 2 | 2 | 2 | 2 | 2 | 2 |
| Stearic acid | 2 | 2 | 2 | 2 | 2 | 2 | 2 | 2 |
| Zinc oxide | 3 | 3 | 3 | 3 | 3 | 3 | 3 | 3 |
| Sulfur | 1.5 | 1.5 | 1.5 | 1.5 | 1.5 | 1.5 | 1.5 | 1.5 |
| Vulcanization accelerator | 2.0 | 2.0 | 2.0 | 2.0 | 2.0 | 2.0 | 2.0 | 2.0 |
| Evaluation Results | | | | | | | | |
| Rubber strength index | 100 | 100 | 100 | 100 | 105 | 105 | 100 | 100 |
| Weather resistance | ○ | ○ | ○ | ○ | ○ | ○ | ○ | X |

TABLE 2

| | Ex. | | | | | | | Com. Ex. |
|---|---|---|---|---|---|---|---|---|
| | 8 | 9 | 10 | 11 | 12 | 13 | 14 | 2 |
| Amounts (part by weight) | | | | | | | | |
| NR | 60 | 60 | 60 | 60 | 60 | 60 | 60 | 60 |
| ENR | 40 | 40 | 40 | 40 | 40 | 40 | 40 | 40 |
| Carbon black | 2 | 2 | 2 | 2 | 2 | 2 | 2 | 2 |
| Silica | 45 | 45 | 45 | 45 | 45 | 45 | 45 | 45 |
| Silane coupling agent | 3.6 | 3.6 | 3.6 | 3.6 | 3.6 | 3.6 | 3.6 | 3.6 |
| Turpentine soot (1) | 10 | — | — | — | — | — | — | — |
| Turpentine soot (2) | — | 5 | — | — | 10 | — | 2.5 | — |
| Lamp black (1) | — | — | 10 | — | — | — | — | — |
| Lamp black (2) | — | — | — | 5 | — | 10 | 2.5 | — |
| Wax | 1.2 | 1.2 | 1.2 | 1.2 | 1.2 | 1.2 | 1.2 | 1.2 |
| Antioxidant | 2.4 | 2.4 | 2.4 | 2.4 | 2.4 | 2.4 | 2.4 | 2.4 |
| Stearic acid | 1 | 1 | 1 | 1 | 1 | 1 | 1 | 1 |
| Zinc oxide | 3 | 3 | 3 | 3 | 3 | 3 | 3 | 3 |
| Sulfur | 1.0 | 1.0 | 1.0 | 1.0 | 1.0 | 1.0 | 1.0 | 1.0 |
| Vulcanization accelerator | 2.0 | 2.0 | 2.0 | 2.0 | 2.0 | 2.0 | 2.0 | 2.0 |
| Evaluation Results | | | | | | | | |
| Rubber strength index | 100 | 100 | 100 | 100 | 105 | 105 | 100 | 100 |
| Weather resistance | ○ | ○ | ○ | ○ | ○ | ○ | ○ | X |

TABLE 3

| | Ex. | | | | | | | Com. Ex. |
|---|---|---|---|---|---|---|---|---|
| | 15 | 16 | 17 | 18 | 19 | 20 | 21 | 3 |
| Amounts (part by weight) | | | | | | | | |
| NR | 100 | 100 | 100 | 100 | 100 | 100 | 100 | 100 |
| Carbon black | 2 | 2 | 2 | 2 | 2 | 2 | 2 | 2 |

TABLE 3-continued

|  | Ex. | | | | | | | Com. Ex. |
|---|---|---|---|---|---|---|---|---|
|  | 15 | 16 | 17 | 18 | 19 | 20 | 21 | 3 |
| Silica | 60 | 60 | 60 | 60 | 60 | 60 | 60 | 60 |
| Silane coupling agent | 4.8 | 4.8 | 4.8 | 4.8 | 4.8 | 4.8 | 4.8 | 4.8 |
| Turpentine soot (1) | 10 | — | — | — | — | — | — | — |
| Turpentine soot (2) | — | 5 | — | — | 10 | — | 2.5 | — |
| Lamp black (1) | — | — | 10 | — | — | — | — | — |
| Lamp black (2) | — | — | — | 5 | — | 10 | 2.5 | — |
| Wax | 1.2 | 1.2 | 1.2 | 1.2 | 1.2 | 1.2 | 1.2 | 1.2 |
| Antioxidant | 2.4 | 2.4 | 2.4 | 2.4 | 2.4 | 2.4 | 2.4 | 2.4 |
| Stearic acid | 2 | 2 | 2 | 2 | 2 | 2 | 2 | 2 |
| Zinc oxide | 3 | 3 | 3 | 3 | 3 | 3 | 3 | 3 |
| Sulfur | 2.0 | 2.0 | 2.0 | 2.0 | 2.0 | 2.0 | 2.0 | 2.0 |
| Vulcanization accelerator | 2.0 | 2.0 | 2.0 | 2.0 | 2.0 | 2.0 | 2.0 | 2.0 |
| Evaluation Results | | | | | | | | |
| Rubber strength index | 100 | 100 | 100 | 100 | 105 | 105 | 100 | 100 |
| Weather resistance index | ◯ | ◯ | ◯ | ◯ | ◯ | ◯ | ◯ | X |

When carbon black was contained in an amount of not more than 5 parts by weight in order to consider an effect on environment and prepare for decrease in supply quantity of petroleum in future, if neither the turpentine soot nor lamp black was contained, weather resistance was deteriorated in all compoundings for respective members as shown in Comparative Examples 1 to 3.

On the other hand, since the rubber compositions of Examples 1 to 21 contain the specified amounts of the turpentine soot and/or lamp black, the obtained rubber compositions for respective tire members can exhibit both of excellent rubber strength and weather resistance.

What is claimed is:

1. A rubber composition comprising:
   not less than 20 parts by weight of a silica,
   not more than 5 parts by weight of a petroleum derived carbon black, and
   2 to 20 parts by weight of a lamp black having an average particle diameter of not more than 500 nm, based on 100 parts by weight of a rubber component comprising a natural rubber and/or an epoxidized natural rubber,
   wherein said petroleum derived carbon black is a raw material derived from petroleum resources and said lamp black is a low grade of carbon black prepared from vegetable oil.

2. The rubber composition of claim 1, wherein the average particle diameter of the lamp black is not more than 300 nm.

3. A tire having a sidewall, tread or clinch formed from the rubber composition of claim 1.

4. A tire having a sidewall, tread or clinch formed from the rubber composition of claim 2.

5. The rubber composition of claim 1, wherein the amount of silica is 20 to 90 parts by weight; the amount of the petroleum derived carbon black is not more than 3 parts by weight; and the amount of the lamp black is 5 to 15 parts by weight.

6. The rubber composition of claim 2, wherein the amount of silica is 20 to 90 parts by weight; the amount of the petroleum derived carbon black is not more than 3 parts by weight; and the amount of the lamp black is 5 to 15 parts by weight.

7. The tire of claim 3, wherein the amount of silica is 20 to 90 parts by weight; the amount of carbon black is not more than 3 parts by weight; and the amount of lamp black is 5 to 15 parts by weight.

8. The tire of claim 4, wherein the amount of silica is 20 to 90 parts by weight; the amount of carbon black is not more than 3 parts by weight; and the amount of lamp black is 5 to 15 parts by weight.

9. The rubber composition of claim 1, wherein the lamp black is produced by subjecting plant oils to imperfect combustion and then collecting obtained soot.

10. The rubber composition of claim 2, wherein the lamp black is produced by subjecting plant oils to imperfect combustion and then collecting obtained soot.

11. The rubber composition of claim 1, wherein the lamp black is produced by subjecting plant oils selected from the group consisting of rape seed oil, sesame oil and tung oil to imperfect combustion and then collecting obtained soot.

12. The rubber composition of claim 2, wherein the lamp black is produced by subjecting plant oils selected from the group consisting of rape seed oil, sesame oil and tung oil to imperfect combustion and then collecting obtained soot.

* * * * *